United States Patent
Shiraishi et al.

(10) Patent No.: US 8,135,241 B2
(45) Date of Patent: Mar. 13, 2012

(54) OPTICAL MODULATION DEVICE UTILIZING ELECTRO-OPTIC EFFECT

(75) Inventors: Takashi Shiraishi, Kawasaki (JP); Tetsuya Miyatake, Kawasaki (JP); Tetsu Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 354 days.

(21) Appl. No.: 12/385,001

(22) Filed: Mar. 27, 2009

(65) Prior Publication Data
US 2009/0324158 A1 Dec. 31, 2009

(30) Foreign Application Priority Data

Jun. 26, 2008 (JP) ................................ 2008-167584

(51) Int. Cl.
G02F 1/035 (2006.01)
G02B 6/10 (2006.01)
(52) U.S. Cl. ........................................ 385/2; 385/129
(58) Field of Classification Search ............... 385/1–15; 359/245, 248, 254
See application file for complete search history.

(56) References Cited

U.S. PATENT DOCUMENTS

| | | | | |
|---|---|---|---|---|
| 5,185,823 A * | 2/1993 | Kaku et al. | ...................... | 385/2 |
| 5,583,637 A * | 12/1996 | Tokano et al. | ................. | 356/477 |
| 5,801,871 A * | 9/1998 | Madabhushi | .................. | 359/245 |
| 5,986,288 A * | 11/1999 | Hasegawa | ........................ | 257/94 |
| 6,021,232 A * | 2/2000 | Madabhushi | ...................... | 385/3 |
| 6,195,198 B1 * | 2/2001 | Hatori | ........................... | 359/332 |
| 6,385,355 B1 * | 5/2002 | Nashimoto et al. | ................ | 385/8 |
| 6,411,747 B2 * | 6/2002 | Rangaraj | ............................ | 385/2 |
| 6,819,851 B2 * | 11/2004 | Aoki et al. | ..................... | 385/129 |
| 6,950,218 B2 * | 9/2005 | Sugiyama et al. | ............. | 359/245 |
| 2002/0126932 A1 | 9/2002 | Minakata et al. | | |
| 2002/0159738 A1 | 10/2002 | Aoki et al. | | |
| 2005/0134952 A1 | 6/2005 | Sugiyama et al. | | |

FOREIGN PATENT DOCUMENTS

| | | |
|---|---|---|
| JP | 05-093892 | 4/1993 |
| JP | 05-257104 | 10/1993 |
| JP | 05-276701 | 10/1993 |
| JP | 10-133159 | 5/1998 |
| JP | 2002-169133 | 6/2002 |
| JP | 2002-357797 | 12/2002 |
| JP | 2005-181537 | 7/2005 |
| JP | 2006-239718 | 9/2006 |

OTHER PUBLICATIONS

Patent Abstracts of Japan, Publication date May 22, 1998, Publication No. 10-133159.
Patent Abstract of Japan, Publication date Sep. 14, 2006, Publication No. 2006-239718.

* cited by examiner

*Primary Examiner* — Akm Ullah
(74) *Attorney, Agent, or Firm* — Staas & Halsey LLP

(57) ABSTRACT

An optical modulation device includes: a crystal substrate having an electro-optic effect; an optical waveguide formed in the crystal substrate; an electrode formed on the crystal substrate, to apply an electric field to the optical waveguide; and a buried layer of low dielectric constant buried to avoid the optical waveguide, in at least one portion of a lower region of the electrode inside the crystal substrate, which is spaced from both of a front surface of the crystal substrate on which the electrode is formed and a rear surface thereof opposed to the front surface.

8 Claims, 15 Drawing Sheets

OPTICAL MODULATION DEVICE UTILIZING ELECTRO-OPTIC EFFECT

CROSS-REFERENCE TO RELATED APPLICATION

This application is based upon and claims the benefit of priority of the prior Japanese Patent Application No. 2008-167584, filed on Jun. 26, 2008, the entire contents of which are incorporated herein by reference.

FIELD

The embodiments discussed herein are related to an optical modulation technology for converting an electric signal into an optical signal utilizing crystal having an electro-optic effect.

BACKGROUND

With speeding-up and large-capacity, in recent optical communication systems, the bandwidth equal to or broader than 40 GHz is demanded. Accordingly, also in an optical modulator used in an optical transmitter or the like, wider bandwidth of equal to or broader than 40 GHz is demanded. A recent optical modulator adopts a Mach-Zehnder optical modulation device in which crystal having an electro-optic effect such as lithium niobate ($LiNbO_3$) serves as a substrate, and an optical waveguide is formed in the substrate, and an electrode is formed on the substrate. Therefore, such an optical modulation device is required to be operable in a band equal to or broader than 40 GHz.

FIGS. 11 and 12 illustrate a plan view of an optical modulation device using the lithium niobate substrate (LN substrate) and an A-A cross section thereof, respectively. In an inner portion under a surface of the LN substrate 1, an optical waveguide 2 is formed by a method of thermally diffusing from a patterned metal film such as titanium or the like, a method of proton exchanging in benzoic acid after patterning the metal film, or the like. The optical waveguide 2 has a structure including parallel two branching portions 2c and 2d arranged between an incidence end portion 2a and an emission end portion 2b An electrode 3 for modulating a light traveling over the foregoing optical waveguide 2 is formed on the LN substrate 1 via a buffer layer 4 of low refractive index, such as a $SiO_2$ film. The electrode 3 is formed to act on the branching portions 2c and 2d, and includes a signal electrode 3a formed on the one branching portion 2c and earth electrodes 3b on both sides of the signal electrode 3a.

The signal electrode 3a is a traveling-wave electrode for applying an electric field to the optical waveguide 2. Namely, a high frequency electric signal in accordance with transmission data is input from one end of the signal electrode 3a and the other end of the signal electrode 3a on the opposite side is terminated at 50 ohm or the like. The widths of and the spaces between the signal electrode 3a and the earth electrodes 3b are designed so that a speed of the electric signal is matched with a speed of the light.

In the case where the foregoing optical modulation device is used in the broadband equal to or broader than 40 GHz, there is a problem in that the high frequency is leaked out into the LN substrate to become another mode, so that the dip (rapid degradation of characteristics) occurs in frequency characteristics. With regard to this, FIG. 13 illustrates frequency transmission characteristics (S21) of the optical modulation device. As illustrated in FIG. 13, the band of the optical modulation device depends on the dip occurrence in the high frequency transmission characteristics, and therefore, it is hard to operate the optical modulation device in the broadband equal to or broader than 40 GHz. As illustrated in FIG. 14, it is considered that such dip occurs as a result that the high frequency electric field leaked out into the LN substrate 1 is coupled to another mode such as a TE mode, a TM mode or the like, and it is known that the frequency occurring the dip differs depending on the thickness or width of the LN substrate 1.

Techniques of suppressing the above-mentioned dip in the optical modulation device using the crystal substrate having the electro-optic effect are disclosed in the following reference literatures 1 to 6.

Reference literature 1: Japanese Laid-open Patent Publication No. H05 (1993)-257104
Reference literature 2: Japanese Laid-open Patent Publication No. 2002-169133
Reference literature 3: Japanese Laid-open Patent Publication No. H05 (1993)-093892
Reference literature 4: Japanese Laid-open Patent Publication No. 2002-357797
Reference literature 5: Japanese Laid-open Patent Publication No. 2005-181537
Reference literature 6: Japanese Laid-open Patent Publication No. H05 (1993)-276701

The reference literature 1 discloses that reducing a thickness of a substrate, to thereby shift the frequency occurring the dip to the frequency higher than the electric signal to be applied on the signal electrode. However, in the case of applying this technique, the thickness of the substrate which is normally about 0.5 mm to 1 mm, needs to be decreased to 0.2 mm or less in order to ensure the band equal to or broader than 40 GHz. Accordingly, the sufficient mechanical strength of the substrate is lacked. Namely, there is a possibility that the substrate is broken during the manufacturing process, or even after mounting in a module, the substrate is broken due to a difference between the thermal expansion thereof and that of a case, a terminal substrate or the like, and therefore, the process yield may be lowered.

The reference literature 2 discloses that making a groove on a rear surface of a substrate to form a thin portion, to thereby decrease a voltage of an electric signal applied to an electrode. In the case of applying this technique, the thin portion of 0.1 mm or less is partially formed on the substrate of normally 1 mm thickness, and therefore, the sufficient mechanical strength of the substrate is still lacked. Further, an adhesive used for attaching the substrate enters into the groove portion, and therefore, there is a possibility to occur the substrate breaking due to a difference between a thermal expansion coefficient of the substrate and that of the adhesive.

The reference literature 3 discloses that attaching a thinned substrate onto a glass substrate of low dielectric constant to enhance the mechanical strength. However, a thermal expansion coefficient of the low dielectric constant substrate such as glass substrate is inconformity with that of the electro-optic crystal substrate (e.g., the thermal expansion coefficient of LN substrate; 15 ppm/deg C. relative to the thermal expansion coefficient of $SiO_2$; 0.5 ppm/deg C.), and accordingly, there is a possibility that the substrate is broken due to the thermal expansion difference. Further, the substrate breaking during processing of making the substrate to be thinned before attaching on the low dielectric constant substrate is not negligible.

The reference literature 4 discloses that attaching a thin substrate onto a case formed with a concaved space to use the concaved space as a low dielectric layer. Also in the case of applying this technique, in order to sufficiently suppress the dip, the substrate needs to be thinned, and accordingly, the substrate breaking during the manufacturing process may not be solved.

On the other hand, the reference literatures 5 and 6 disclose techniques different from the above-mentioned techniques such as making the substrate to be thinned. The reference literature 5 discloses that forming a conductive floating electrode on a side portion of a substrate to suppress a resonance of the substrate with specific frequency, to thereby avoid the dip. Since the substrate is not made to be thinned in this technique, this technique is more preferable than the above-mentioned techniques in view of the mechanical strength. However, the dip is not suppressed but is dispersed over the frequencies in the technique of the reference literature 5, and therefore, the band degradation easily occurs compared with the above-mentioned techniques of making the substrate to be thinned. Further, the reference literature 6 discloses that forming a substrate shape non-uniformly in the thickness and width to disperse the dip. However, also in this technique, the dip is not suppressed but is dispersed, and accordingly, the band degradation is not negligible.

As described in the above, there has not yet been proposed a technology capable of achieving both of the dip suppression and the mechanical strength of the crystal substrate having the electro-optic effect, for corresponding to the broadband equal to or broader than 40 GHz. Therefore, it is considered that an optical modulation device having a structure capable of suppressing the dip without lowering the mechanical strength and a manufacturing method for the optical modulation device are required hereafter.

SUMMARY

An optical modulation device proposed herein includes: a crystal substrate having an electro-optic effect; an optical waveguide formed in the crystal substrate; an electrode formed on the crystal substrate, for applying an electric field to the optical waveguide; and a buried layer of low dielectric constant buried to avoid the optical waveguide, in at least one portion of a lower region of the electrode inside the crystal substrate, which is spaced from both of a front surface of the crystal substrate on which the electrode is formed and a rear surface thereof opposed to the front surface.

A method for manufacturing the optical modulation device according to the above-mentioned proposition which further includes at least one external connection passage to communicates the buried layer with the outside of the crystal substrate is proposed herein. The method proposed herein includes: irradiating an ultra-short pulsed laser to a portion of the crystal substrate in which the buried layer and the external connection passage are to be formed, to make the laser irradiated portion to be amorphous; and selectively etching the amorphous portion from the crystal substrate.

Further, a method for manufacturing the optical modulation device according to the above-mentioned proposition, in which at least one end portion of the buried layer is exposed to a side surface of the crystal substrate, is proposed herein. The method proposed herein includes: irradiating an ultra-short pulsed laser to a portion of the crystal substrate in which the buried layer is to be formed, to make the laser irradiated portion to be amorphous; and selectively etching the amorphous portion from the crystal substrate. Alternatively, a method for manufacturing the optical modulation device in which at least one end portion of the buried layer is exposed to a side surface of the crystal substrate same as the above-mentioned device, proposed herein includes cutting a portion of the crystal substrate in which the buried layer is to be formed, via the side surface of the crystal substrate to which the end portion of the buried layer is exposed.

Furthermore, a method for manufacturing the optical modulation device according to the above-mentioned proposition, proposed herein includes irradiating an ultra-short pulsed laser to a portion of the crystal substrate in which the buried layer is to be formed, to form a hollow hole in the laser irradiated portion.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

In an embodiment of the optical modulation device, since a buried layer of low dielectric constant is disposed in a lower region of an electrode (i.e., a pathway of electric force line) inside a crystal substrate to suppress coupling of a high frequency electric field leaked out into the crystal substrate to another mode, the dip of frequency characteristics can be suppressed. The buried layer is formed inside the crystal substrate, and is spaced from both of a front surface of the crystal substrate and a rear surface thereof. Namely, the buried layer is of a shape formed by partially hollowing out the inside of the crystal substrate, and is not formed by thinning the substrate thickness or by making a groove on the rear surface, and accordingly, the degradation of the mechanical strength of the crystal substrate is low. Accordingly, the optical modulation device proposed herein is capable of achieving both the dip suppression and the mechanical strength.

Further, according to a method for manufacturing the optical modulation device proposed herein, it is possible to form the buried layer inside the crystal substrate without processing which largely lowers the mechanical strength of the crystal substrate such as making a large opening on the front surface of the crystal substrate on which an electrode is formed or the rear surface thereof opposed to the front surface. Furthermore, especially, since a groove, a hole or the like which opens to the rear surface of the substrate are not formed, it is possible to suppress entering the adhesive used when the crystal substrate is attached to a case into the buried layer.

Figure 1:
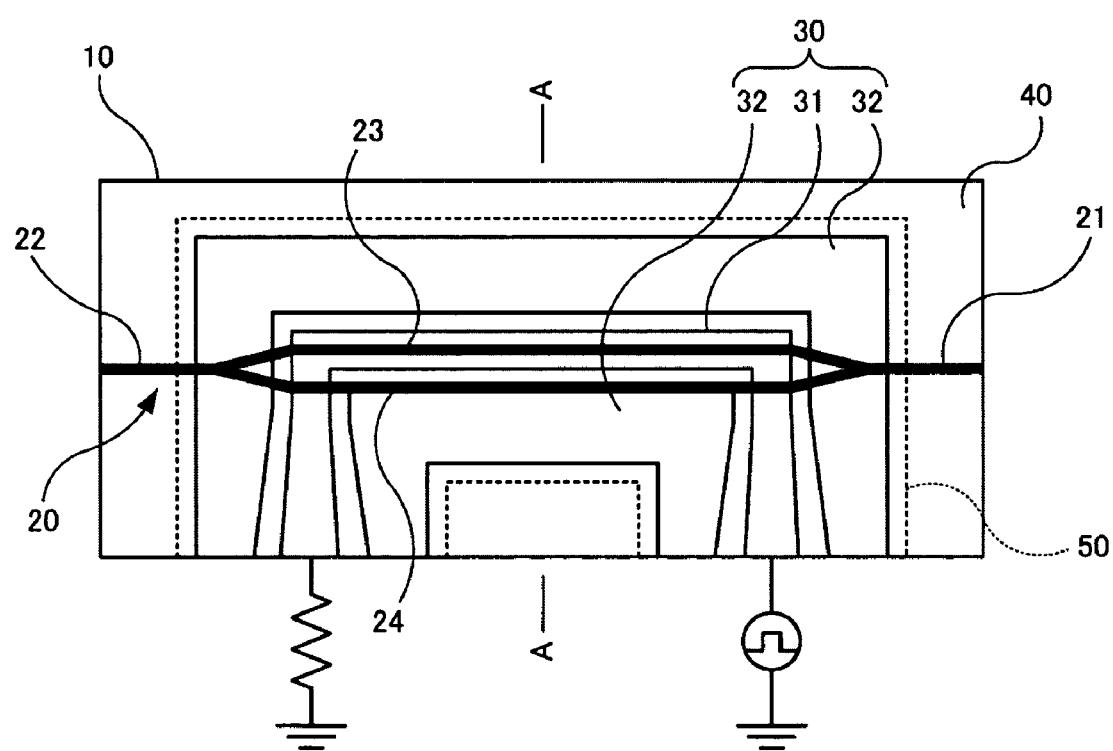
FIG. 1 is a plan view of an optical modulation device according to a first embodiment.
Figure 2:
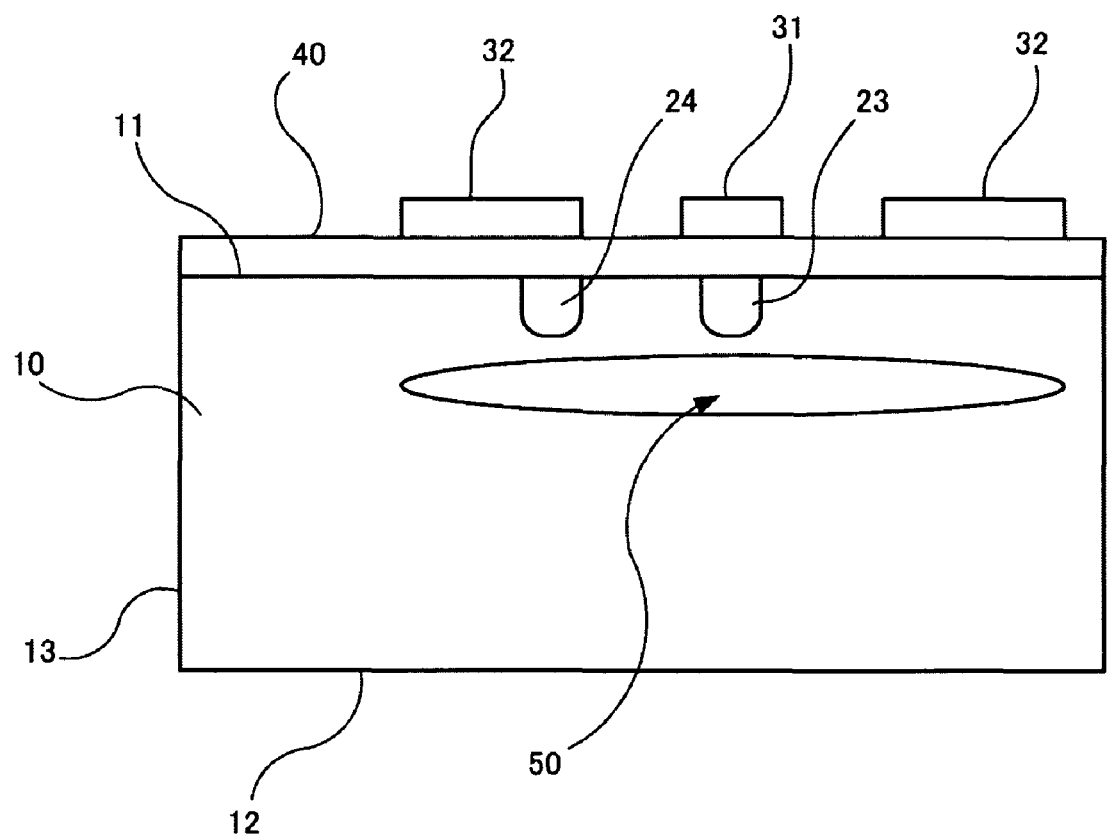
FIG. 2 is a sectional view of the optical modulation device according to the first embodiment.

A first embodiment of the optical modulation device is illustrated in a plan view of FIG. 1 and in an A-A line sectional view of FIG. 2. This optical modulation device is a Mach-Zehnder optical modulation device using a lithium niobate (LiNbO$_3$) substrate (LN substrate) as one example of the crystal substrates having an electro-optical effect.

In an inner portion under a front surface of LN substrate 10, an optical waveguide 20 is formed by a method of thermally diffusing from a patterned metal film such as a titan film, a method of proton exchanging in benzoic acid after patterning the metal film, or the like. The optical waveguide 20, for example, has a structure including parallel two branching portions 23 and 24 between an incident end portion 21 and an emission end portion 22. Further, an electrode 30 for modulating a light traveling over the foregoing optical waveguide 20 is formed on the front surface of the LN substrate 10 via a buffer layer 40 of low refractive index, such as a SiO$_2$ film. The electrode 30 is formed so as to act on the branching portions 23 and 24, and includes a signal electrode 31 formed on the one branching portion 23 and earth electrodes 32 on both sides of the signal electrode 31.

The signal electrode 31 is a traveling-wave electrode for applying an electric field to the optical waveguide 20. Namely, a high frequency electric signal in accordance with transmission data is input from one end of the signal electrode 31, and the other end thereof on the opposite side of the one end is terminated at 50 ohm or the like. The widths of and the spaces between the signal electrode 31 and the earth electrodes 32 are designed so that a speed of the electric signal is matched with a speed of the light.

A buried layer 50 of low dielectric constant is formed inside the LN substrate 10 having the foregoing electrode 30 on the front surface thereof. The buried layer 50 is formed over an entire region under the electrode 30, that is, so as to overlap the lower side of the electrode 30 along a shape thereof, in the substrate. Also, the buried layer 50 is spaced from both the front surface 11 (an electrode 30 is formed thereon) of the LN substrate 10 and the rear surface 12 opposed to the front surface 11. Since the buried layer 50 is formed over the entire region under the electrode 30, end portions of the buried layer 50 reach a side surface 13 of the LN substrate 10 to be exposed to the outside of the LN substrate 10 (refer to a region surrounded by broken lines in FIG. 1). Incidentally, the optical waveguide 20 is formed near the front surface of the LN substrate 10, and therefore, is not contained in the buried layer 50 formed on a position spaced from the front surface 11 of the LN substrate 10. Namely, the buried layer 50 is buried so as to avoid the optical waveguide 20.

Since the buried layer 50 is spaced from both of the front surface 11 of the LN substrate 10 and the rear surface 12 thereof, and is in a state of being buried inside the LN substrate 10, the presence of the buried layer 50 does not largely lower the mechanical strength of the LN substrate 10. The mechanical strength of the LN substrate 10 is significantly higher than that in another technologies such as thinning a substrate or making a groove. Further, since the buried layer 50 has no groove or hole opening to the rear surface 12 of the LN substrate 10, the adhesive does not enter into the buried layer 50 when the optical modulation device is attached to a case.

Figure 14:
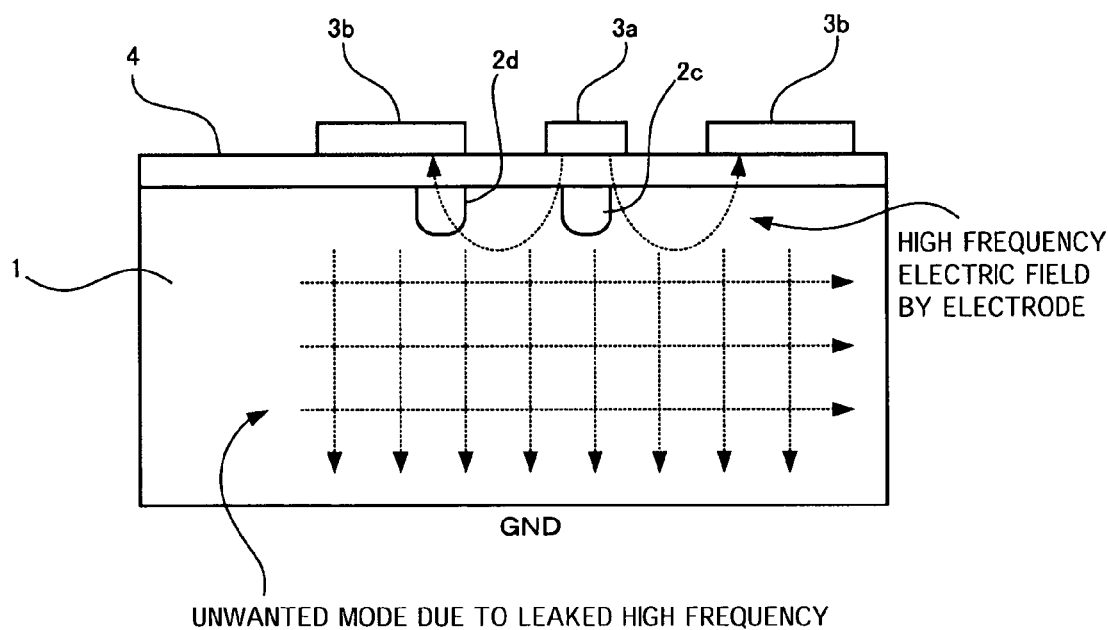
FIG. 14 is an explanatory view of the causes of the dip.

On the other hand, the buried layer 50 of low dielectric constant is disposed under the electrode 30, namely, in the region where the electric field generated by the high frequency electric signal applied on the electrode 30 acts (i.e., the electric force line pathway), and therefore, as explained with regard to FIG. 14, the coupling of the leaked out high frequency electric field to another mode are suppressed, so that the dip of frequency characteristics are suppressed. The buried layer 50 for the dip suppression may be formed in a hollow shape (including a state in which amorphous portions and hole portions are mixed). When the buried layer 50 is formed in the hollow shape, it is possible to make the buried layer 50 to be in a vacuum state, or to fill the buried layer 50 with air, inert gas or the like. Alternatively, it is also possible to fill a substance of low dielectric constant into the buried layer 50. When the inert gas or the like is filled into the buried layer 50, it is possible to perform a method of filling the inert gas into a module including the optical modulation device at an assembling time of the module to tightly seal the module after assembling. The foregoing buried layer 50 is preferably formed closer to the front surface 11 of the substrate in a range avoiding the optical waveguide 20. Further, the thickness of the buried layer 50 (the vertical width in the figure) is preferably made to be thicker while considering the balance thereof with the mechanical strength. By disposing such buried layer 50, as additional effects, it is possible to obtain effects, such as, the band improvement and the drive voltage reduction as disclosed in Japanese Laid-open Patent Publication No. 10-133159, for example.

Figure 3:
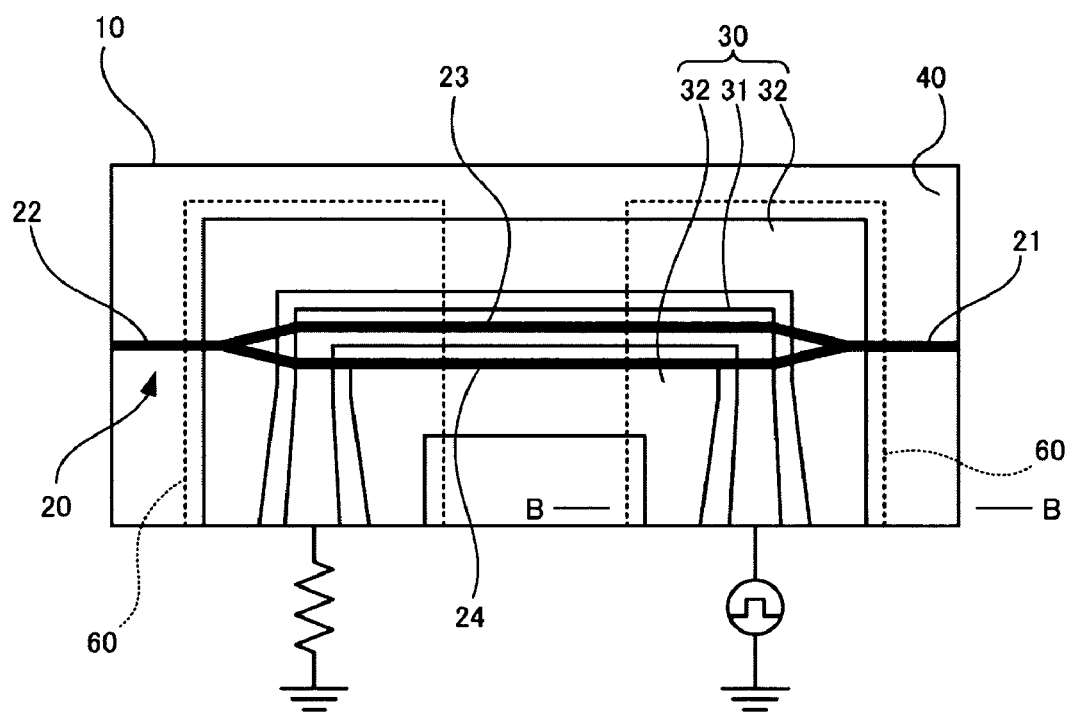
FIG. 3 is a plan view of an optical modulation device according to a second embodiment.
Figure 4:
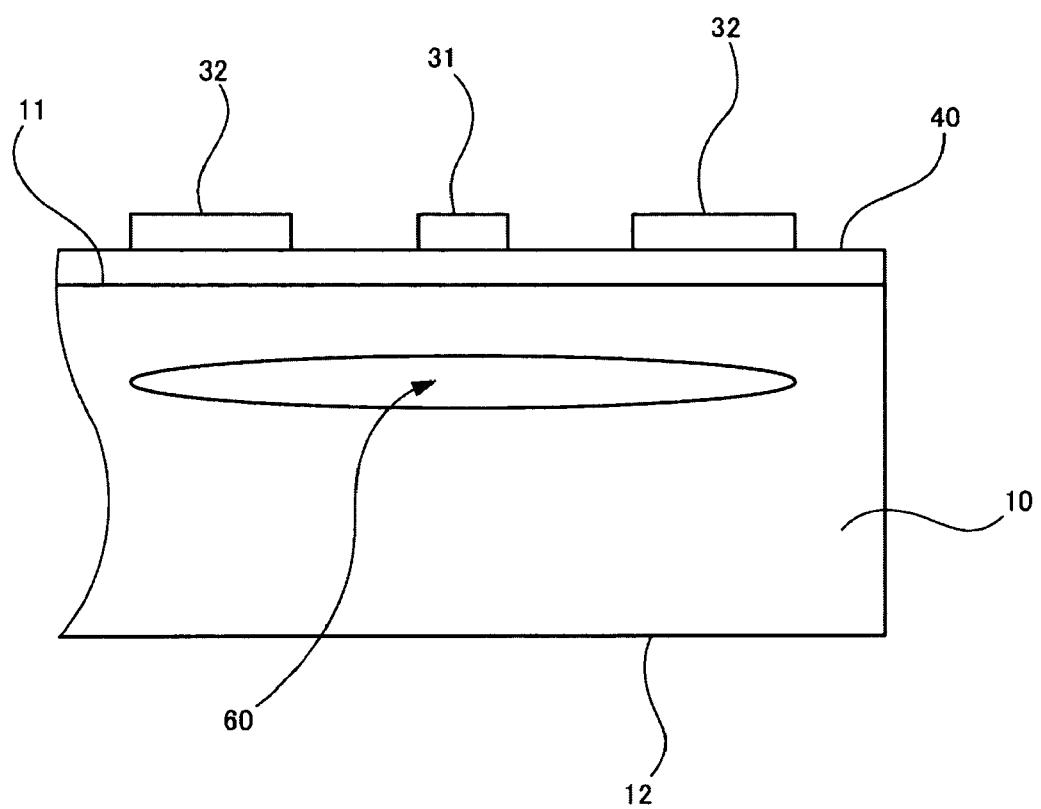
FIG. 4 is a sectional view of the optical modulation device according to the second embodiment.

FIGS. 3 and 4 illustrate a second embodiment. FIG. 3 is a plan view and FIG. 4 is a B-B line sectional view of FIG. 3. An optical modulation device in the second embodiment is an example in which a buried layer is partially disposed under an electrode. Components common to those in the first embodiment are denoted by same reference numerals, and accordingly, the explanation thereof is omitted herein.

The electrode 30 is formed in a planar shape of substantially U-shape, and end portions thereof are connected to an electric circuit by wire bonding, and therefore, spaces between the signal electrode 31 and the earth electrodes 32 at the end portions thereof is extended. Further, portions between the end portions and curved portions (corner portions) of substantially U-shape are tapered portions where the spaces is narrowed. A straight portion between the curved portions is a working portion acting to the optical waveguide 20. Thus, regarding the electrode 30, since the spaces is extended in the end portions and the tapered portions, the high frequency electric field spreads into the substrate to be easily leaked out into the substrate in these portions. Also, in the curved portions, the electric field is easily leaked out into the substrate by the radiation. Therefore, a buried layer 60 in the second embodiment is formed in the site under the electrode 30 where the high frequency is easily leaked out, namely, only in a lower region of the end portions-tapered portions-curved portions. Incidentally, according to circumstances, it is also possible to form the buried layer 60 only in the end portions, only in the tapered portions or only in the curved portions.

Figure 5:
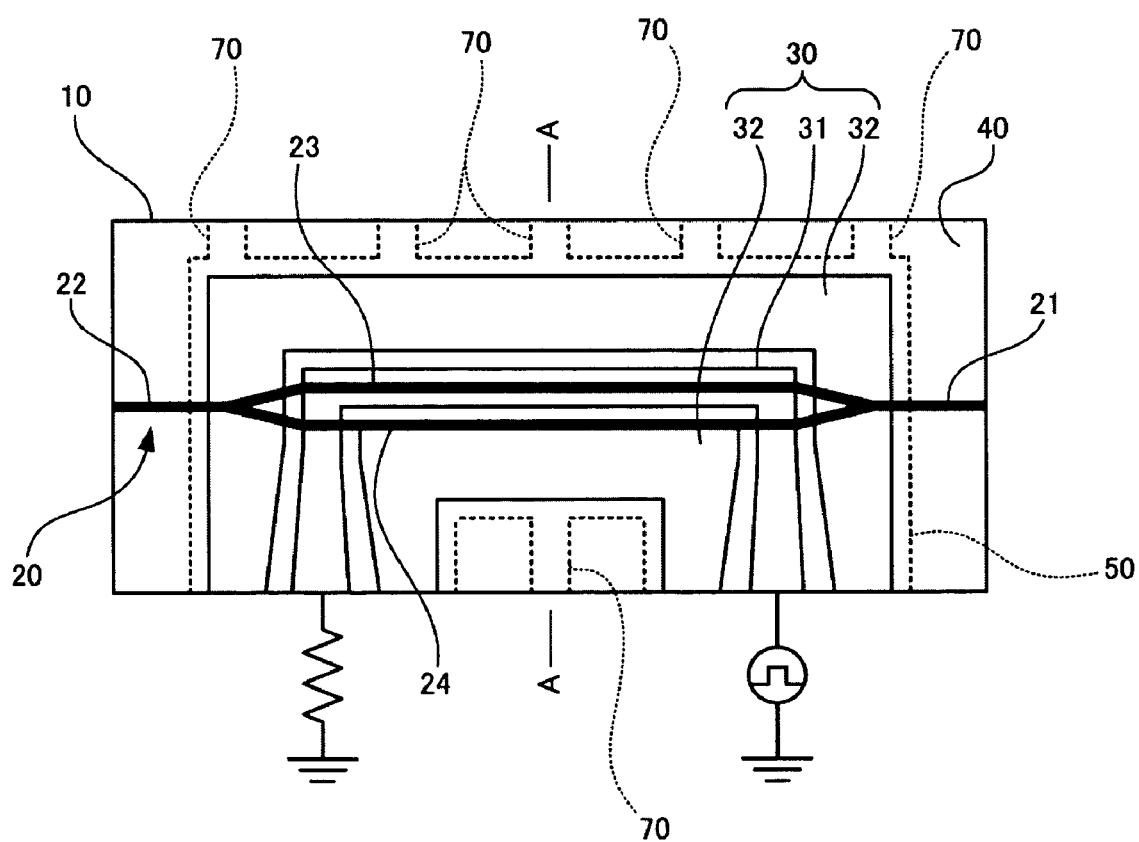
FIG. 5 is a plan view of an optical modulation device according to a third embodiment.
Figure 6:
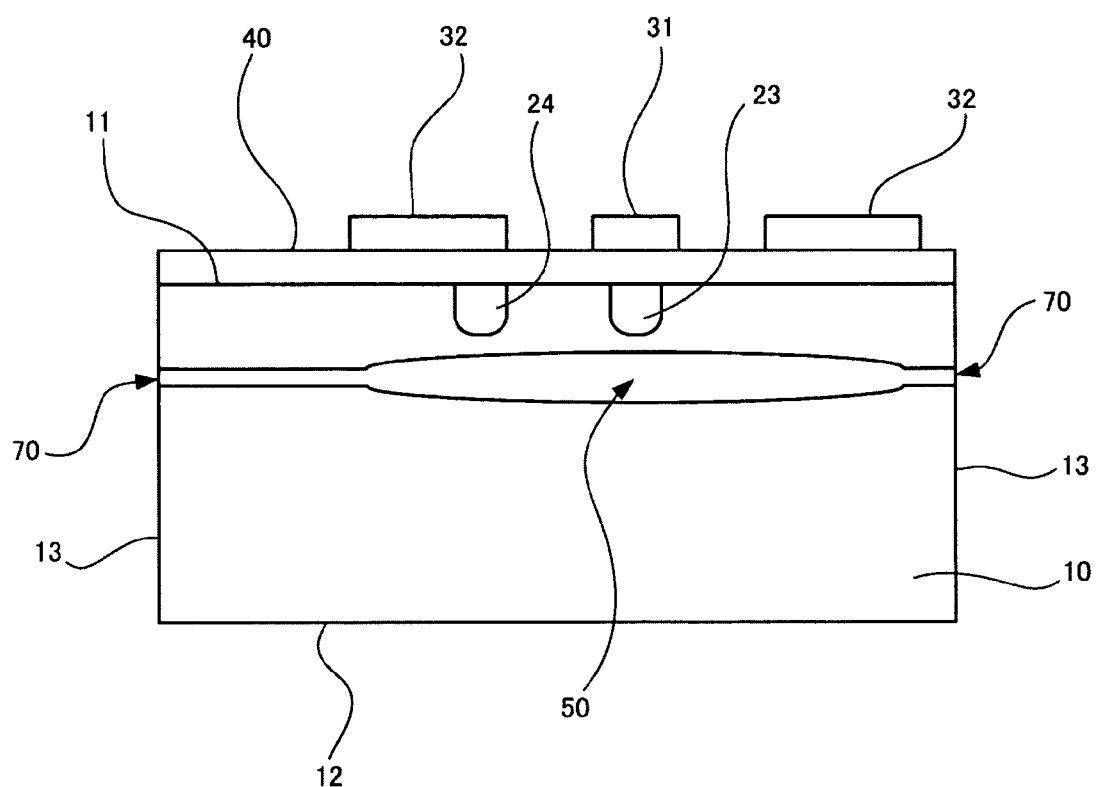
FIG. 6 is a sectional view of the optical modulation device according to the third embodiment.

A third embodiment of the optical modulation device is illustrated in a plan view of FIG. 5 and an A-A line sectional view of FIG. 6. The third embodiment is an example further including external connection passages for communicating a buried layer with an outside of a LN substrate, separately from end portions of the buried layer. Incidentally, components common to those of the first embodiment are denoted by same reference numerals, and accordingly, the explanation thereof is omitted herein.

The buried layer 50 in the third embodiment is formed over the entire lower region of the electrode similarly to that in the first embodiment, further, a plurality of external connection passages 70 for communicating the buried layer 50 with the outside of the LN substrate 10 is formed. Each of the external connection passages 70 is a passage connecting between the buried layer 50 and the side surfaces 13 of the LN substrate 10, and contributes to the time shortening of etching process described below. Currently, the thickness of the LN substrate 10 is generally 0.5 mm to 1 mm, the width (length in a short side direction) of the LN substrate 10 is generally 1 mm to 2 mm and the length (length in a long side direction) of the LN substrate 10 is generally 10 mm to 90 mm. Therefore, by forming at least one external connection passage 70 at predetermined pitches in the length direction (in the long side direction) of the LN substrate 10, the penetration of etching liquid can be speeded up and an etching time can be shortened. An aperture of each external connection passage 70 is preferably made minimum so as not to influence on the mechanical strength of the substrate.

Figure 7:
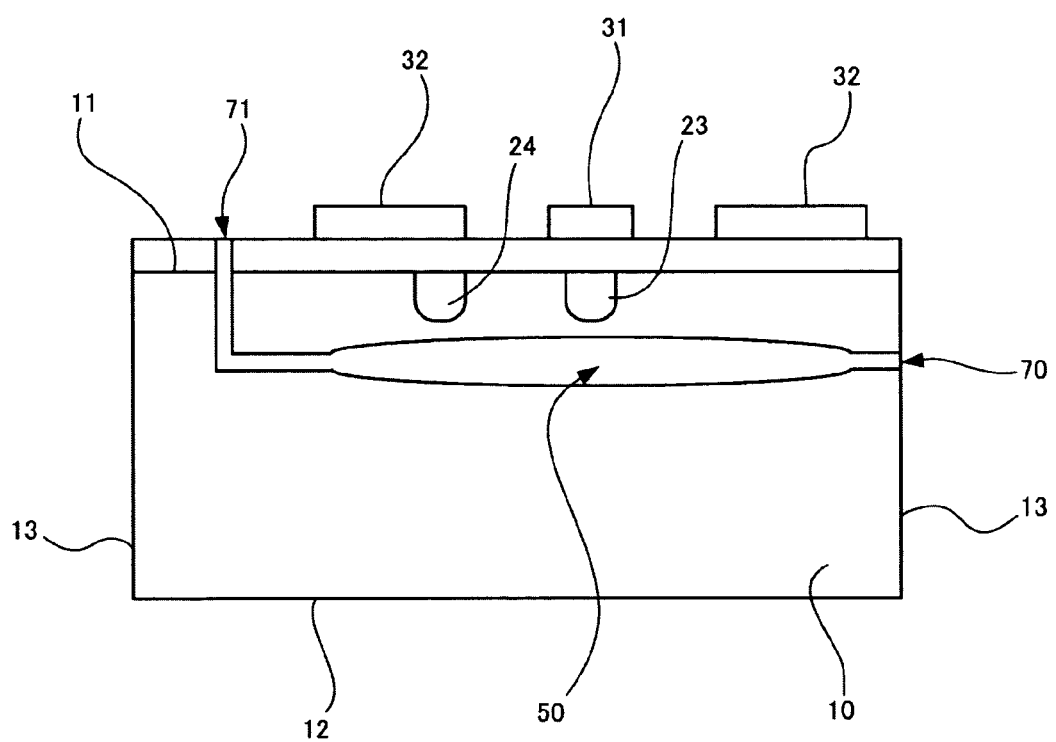
FIG. 7 is a sectional view of an optical modulation device according to a fourth embodiment.

FIG. 7 illustrates a modified example of the external connection passage with a sectional view corresponding to FIG. 6, as a fourth embodiment. In the fourth embodiment, several external connection passages are opened to a front surface of a substrate. Namely, some external connection passages 70 open to the side surface 13 similarly to that in FIG. 6, and other external connection passages 71 are curved toward the front surface 11 of the LN substrate 10 to open to the front surface 11. When a distance from the buried layer 50 to the side surface 13 of the LN substrate 10 is long, such as when the width of LN substrate 10 is large, it may be possible to decrease the length of the external connection passage 71 by rather opening the external connection passage to the front surface 11. It is preferable to decrease the passage length for the time shortening of etching process.

Figure 8:
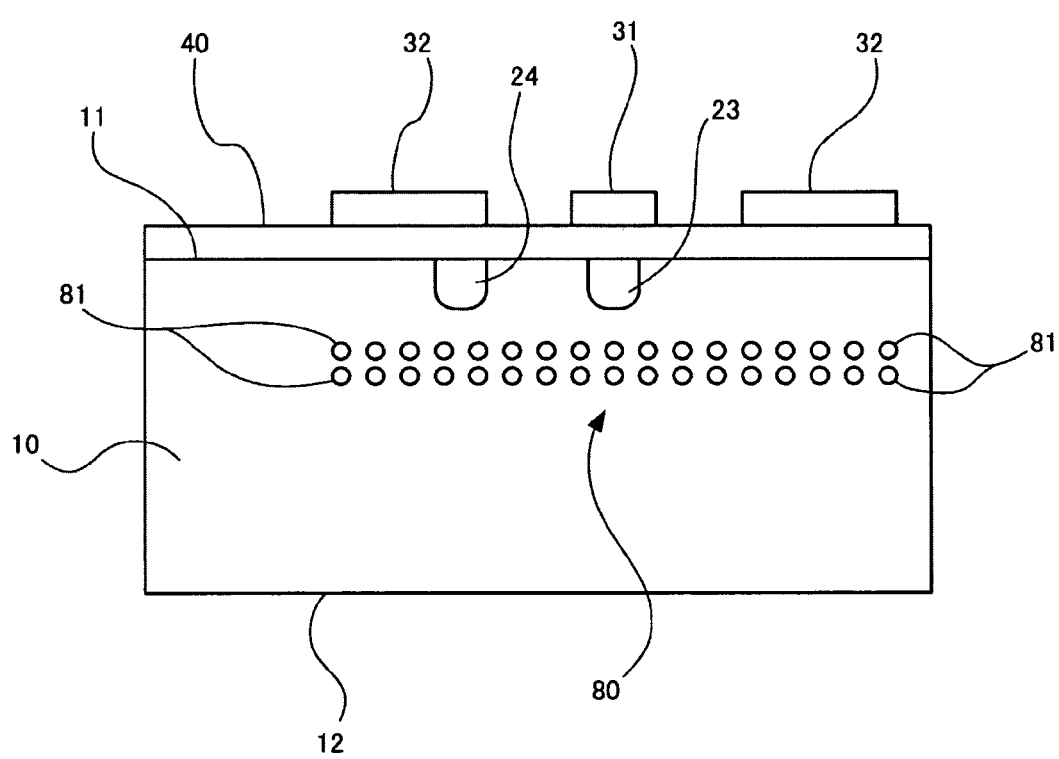
FIG. 8 is a sectional view of an optical modulation device according to a fifth embodiment.

FIG. 8 illustrates a fifth embodiment in which a shape of buried layer is different, with a sectional view corresponding to FIG. 2. Incidentally, components common to those in the first embodiment are denoted by same reference numerals, and accordingly, the explanation thereof is omitted herein.

A buried layer 80 in the fifth embodiment comprises a bundle of a large number of hollow holes 81 over an entire lower region of an electrode corresponding to the buried layer 50 of FIG. 1. Each hollow hole 81 can be formed by irradiating back and forth an ultra-short pulsed laser such as a femtosecond laser along a region where the buried layer 80 is to be formed, as disclosed in Japanese Laid-open Patent Publication No. 2006-239718, for example. By this buried layer 80 comprising the bundle of hollow holes 81, it is also possible to obtain the effect suppressing the dip without lowering the mechanical strength of the LN substrate 10. Incidentally, if the buried layer 80 is present at least partly as in the second embodiment, the effect can be obtained.

FIGS. 9A to 9E illustrate a process chart for a method for manufacturing the optical modulation device according to each of the first to fourth embodiment.

Figure 9A:
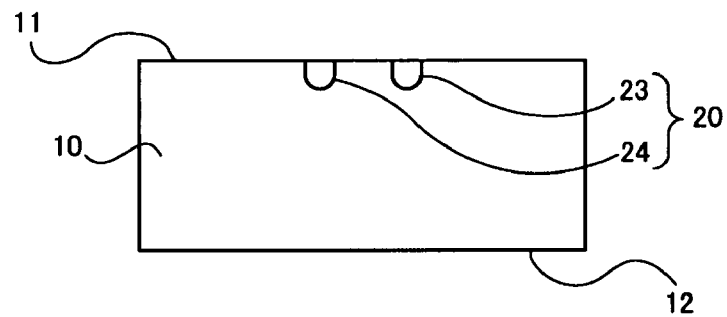
FIG. 9 is a view of manufacturing processes of the optical modulation device according to each of the first to fourth embodiments.

In a process in FIG. 9A, firstly, the metal film, for example, the titanium film, is patterned on the site of the LN substrate 10 where the optical waveguide 20 is to be formed, and the thermal diffusion or the proton exchange is performed to thereby form the optical waveguide 20.

Figure 9B:
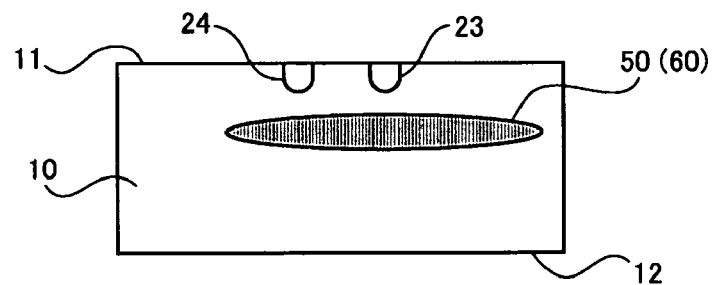

In a process in FIG. 9B, the ultra-short pulsed laser such as the femtosecond laser is irradiated and scanned to the internal region of the LN substrate 10 corresponding to the lower side of the region where the electrode 30 is to be formed, namely the region where the buried layers 50, 60 (and the external connection passages 70, 71) are to be formed, to thereby make the laser irradiated region to be amorphous. In this laser irradiating process, by repetitively scanning the ultra-short pulsed laser to the region where the buried layer is to be formed, the entire region where the buried layer is to be formed is made to be amorphous.

Figure 9C:
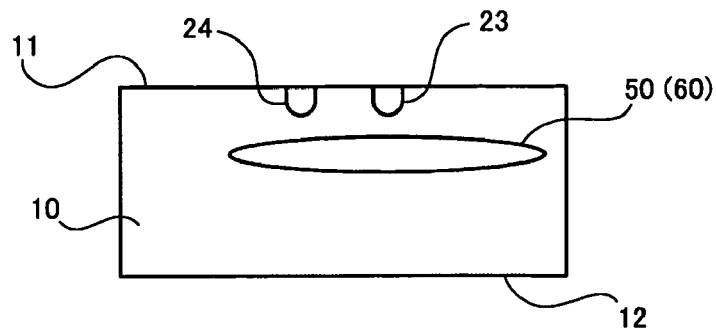

In a process in FIG. 9C, the LN substrate 10 is immersed in the etching liquid, to thereby execute wet etching. This etching process is selective etching using the etching liquid in large selectivity of amorphous portion (high etching speed). As the etching liquid, for example, HF (hydrofluoric acid), $HF+2HNO_3$ mixture or acid/alkali such as KOH may be used. However, when using the etching liquid that may damage the LN substrate 10, it is preferable to mask in advance the surface of the LN substrate in which the optical waveguide 20 is formed, with photoresist or the like.

Figure 9D:
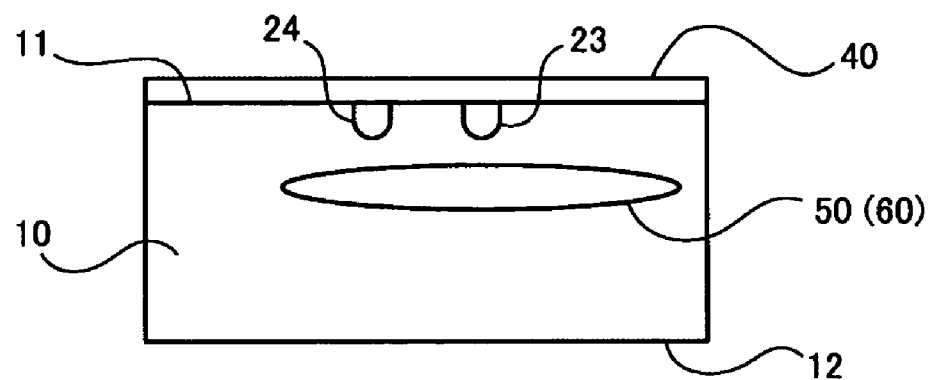

In a process in FIG. 9D, using sputtering, the buffer layer 40 such as $SiO_2$ is formed on the front surface of the LN substrate 10 in which the optical waveguide 20 is formed.

Figure 9E:
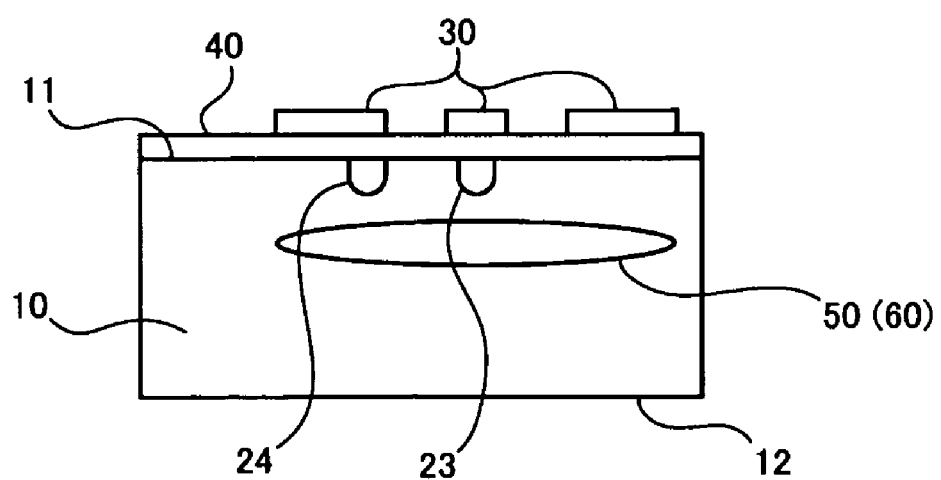

In a process in FIG. 9E, a base electrode is patterned on the buffer layer 40, to thereby form the thick film electrode 30 by plating or the like.

Incidentally, a process order is not limited to the above-mentioned order, and can be appropriately changed, such as, FIG. 9B>>>FIG. 9C>>>FIG. 9A>>>FIG. 9D>>>FIG. 9E or FIG. 9A>>>FIG. 9D>>>FIG. 9E>>>FIG. 9B>>>FIG. 9C, if required.

The above description is the manufacturing process example for when the buried layer 50 (and the external connection passages 70, 71) is formed in each of the first embodiment, the third embodiment and the fourth embodiment. However, when the buried layer 60 in the second embodiment is formed, the etching process after the laser irradiating process is not indispensable. Namely, the end portions of the buried layer 60 are exposed to the side surface 13 of the LN substrate 10, and further, since the planar shape of the buried layer 60 is rectangular, the buried layer can be directly formed by cutting the LN substrate 10 from the side surface 13 to which the end portions of the buried layer are exposed. For this cutting process, it is possible to use laser processing or sandblast processing.

Figure 10A:
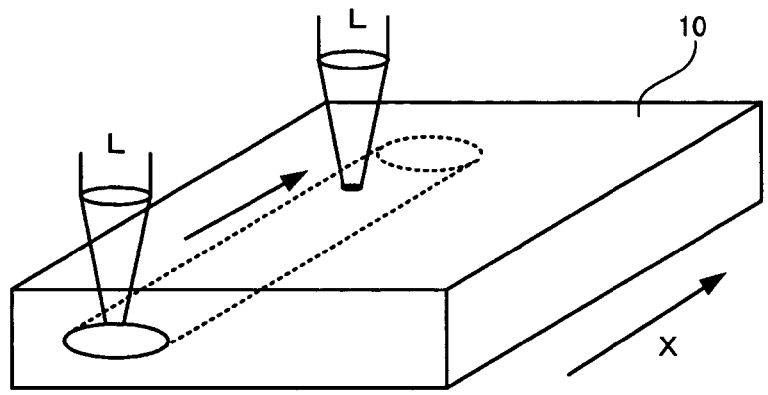
FIG. 10 is an explanatory view of a processing method with an ultra-short pulsed laser.
Figure 10B:
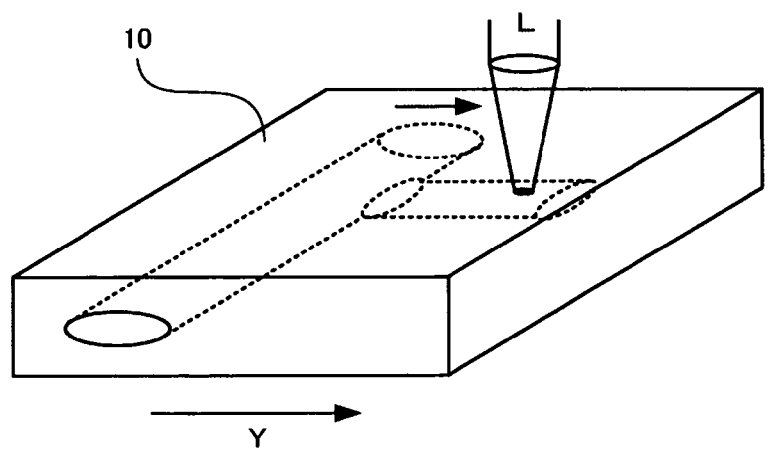
Figure 10C:
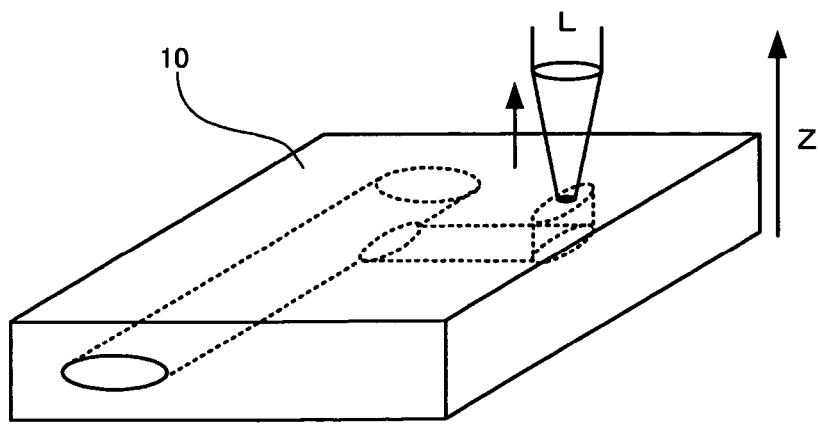
Figure 11:
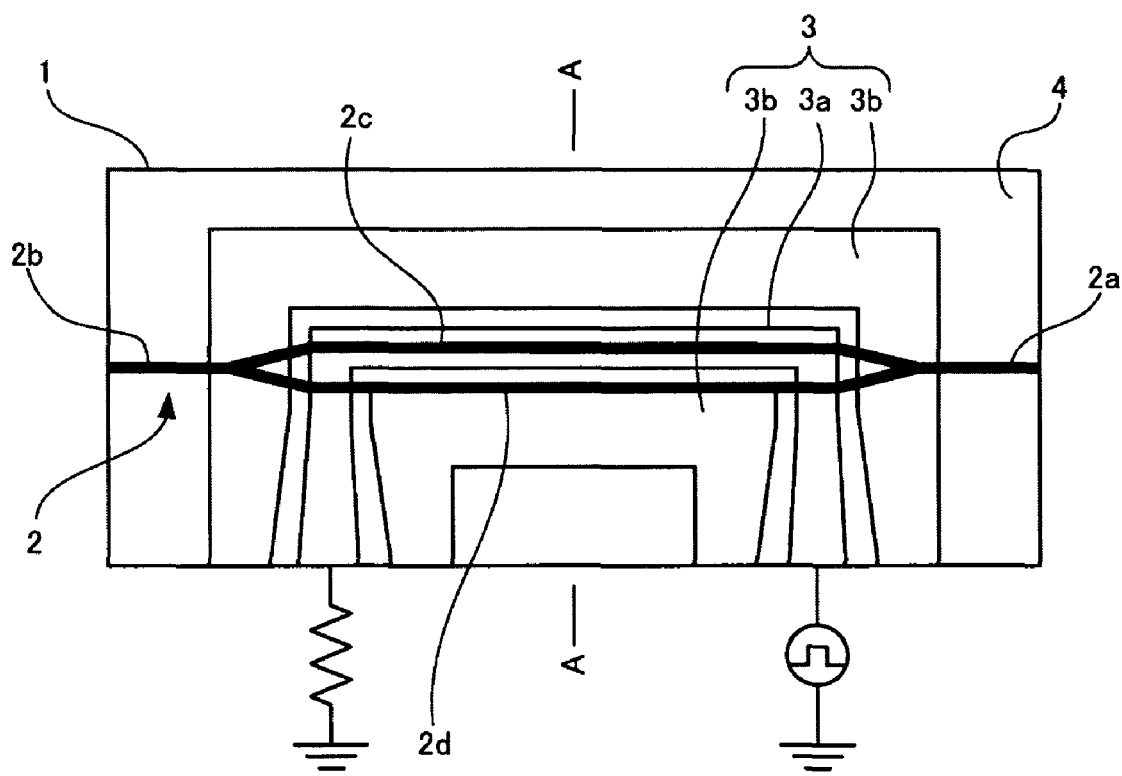
FIG. 11 is a plan view of an optical modulation device according to a related art.
Figure 12:
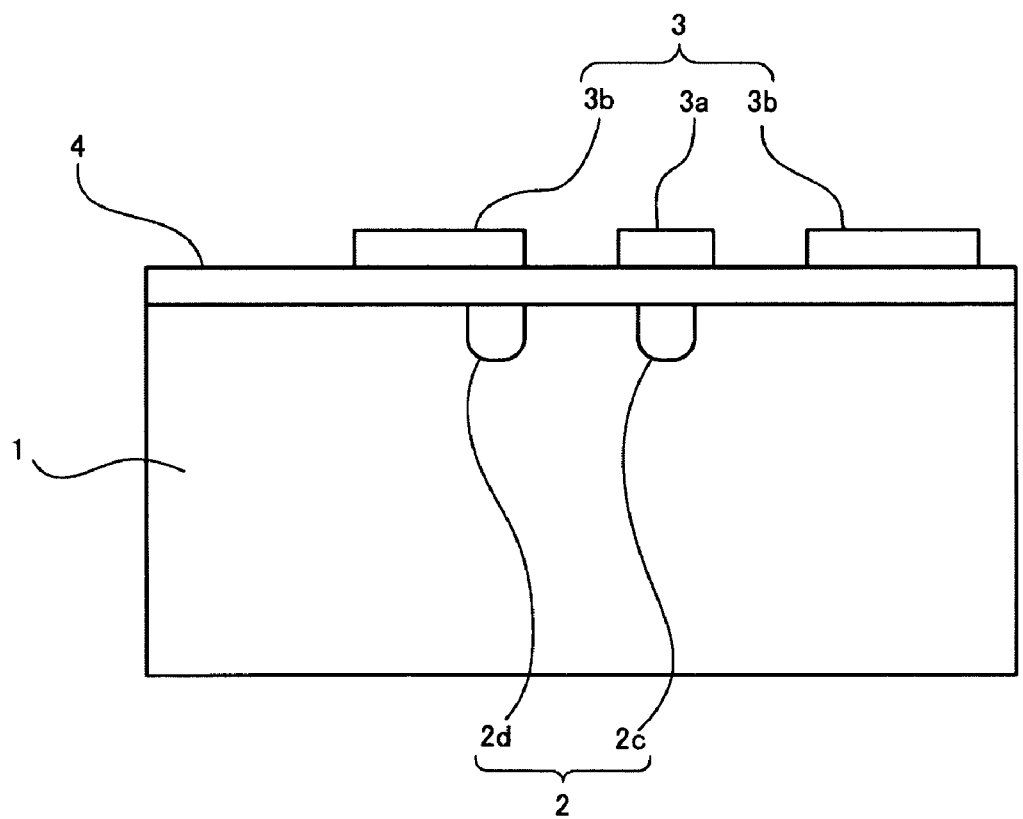
FIG. 12 is a sectional view of the optical modulation device according to the related art.
Figure 13:
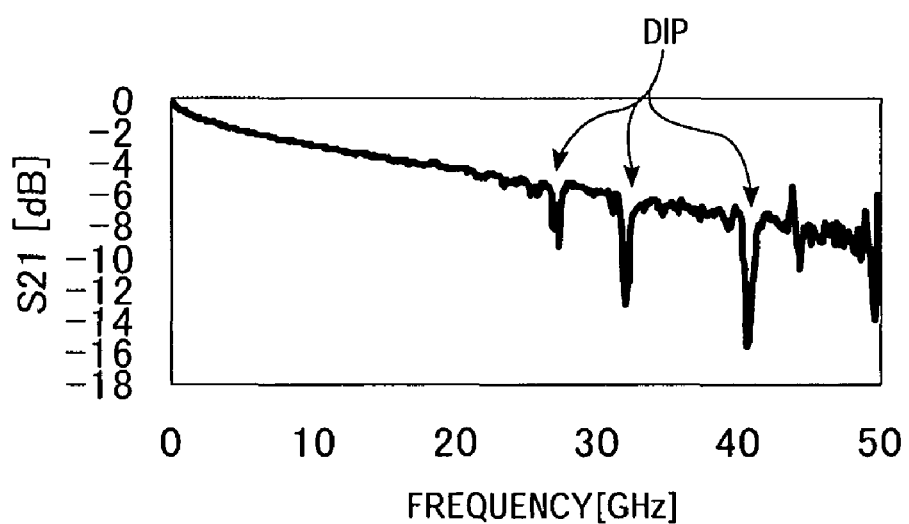
FIG. 13 is a graph of frequency transmission characteristics for explaining the dip.

FIG. 10 illustrates an example of irradiating technique of ultra-short pulsed laser for when the region where the buried layer and the external connection passage are to be formed is made to be amorphous. As illustrated in FIGS. 10A, 10B and 10C, the amorphous region of three-dimensional shape can be formed by scanning the ultra-short pulsed laser L to an X-axis direction, a Y-axis direction and a Z-axis direction of the LN substrate 10. Other than the scanning control of the ultra-short pulsed laser L, similar processing can be achieved by mounting the LN substrate 10 on a XYZ stage to perform a moving control of the LN substrate 10.

According to the method for manufacturing the device as described above, it is unnecessary to perform such processing which damages the mechanical strength of the substrate, such as, disposing a large opening on the front surface 11 of the LN substrate 10 on which the electrode 30 is formed or the rear surface 12 thereof opposed to the front surface 11.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulation device comprising:
   a crystal substrate having an electro-optic effect;
   an optical waveguide formed in the crystal substrate;
   an electrode formed iron a front surface of the crystal substrate, which electrode applies an electric field to the optical waveguide; and
   a buried layer of low dielectric constant buried in an internal portion of the crystal substrate except a portion containing the optical waveguide, wherein the buried layer is at least partially formed in a region of the internal portion of the crystal substrate under the electrode, and is spaced from both of the front surface of the crystal substrate and a rear surface thereof opposed to the front surface.

2. An optical modulation device according to claim 1, further comprising;
   at least one external connection passage which communicates the buried layer with an outside of the crystal substrate.

3. An optical modulation device according to claim 2, wherein
   the at least one external connection passage is opened to a side surface of the crystal substrate.

4. An optical modulation device according to claim 2, wherein
   the at least one external communication passage is opened to the front surface of the crystal substrate.

5. An optical modulation device according to claim 1, wherein
   at least one end portion of the buried layer is exposed to a side surface of the crystal substrate.

6. An optical modulation device according to claim 1, wherein the buried layer is hollow.

7. An optical modulation device according to claim 1, wherein the crystal substrate is a lithium niobate substrate.

8. An optical modulation device according to claim 1, wherein the electrode is formed as a traveling-wave electrode.

* * * * *

UNITED STATES PATENT AND TRADEMARK OFFICE
CERTIFICATE OF CORRECTION

PATENT NO. : 8,135,241 B2
APPLICATION NO. : 12/385001
DATED : March 13, 2012
INVENTOR(S) : Takashi Shiraishi et al.

Page 1 of 1

It is certified that error appears in the above-identified patent and that said Letters Patent is hereby corrected as shown below:

Column 9, Line 15, In Claim 1, delete "iron" and insert -- on --, therefor.

Signed and Sealed this
Seventeenth Day of July, 2012

David J. Kappos
*Director of the United States Patent and Trademark Office*